United States Patent [19]
Geraldi et al.

[11] Patent Number: 5,551,288
[45] Date of Patent: Sep. 3, 1996

[54] MEASURING ICE DISTRIBUTION PROFILES ON A SURFACE WITH ATTACHED CAPACITANCE ELECTRODES

[75] Inventors: Joseph J. Geraldi; Gail A. Hickman, both of Dryden; Ateen A. Khatkhate; Dan A. Pruzan, both of Ithaca, all of N.Y.

[73] Assignee: Innovative Dynamics, Inc., Ithaca, N.Y.

[21] Appl. No.: 407,940

[22] Filed: Mar. 20, 1995

Related U.S. Application Data

[63] Continuation of Ser. No. 28,436, Mar. 9, 1993, Pat. No. 5,398,547, which is a continuation-in-part of Ser. No. 518,043, May 4, 1990, Pat. No. 5,191,791, which is a continuation-in-part of Ser. No. 295,722, Jan. 10, 1989, Pat. No. 5,206,806.

[51] Int. Cl.$^6$ .......................... G08B 19/02; G01R 27/26
[52] U.S. Cl. ...................... 73/170.26; 340/580; 340/962; 324/671; 324/688; 324/689
[58] Field of Search ................................ 73/170.26, 147; 340/580, 962; 324/671, 688, 689, 690; 244/134 D, 134 F

[56] References Cited

U.S. PATENT DOCUMENTS

| | | | |
|---|---|---|---|
| 2,412,626 | 12/1946 | Malthaner | 324/671 |
| 2,789,281 | 4/1957 | Short et al. | |
| 2,800,647 | 7/1957 | Baerwald et al. | |
| 3,240,054 | 3/1966 | Roth | |
| 3,491,292 | 1/1970 | Evans | 324/689 |
| 3,811,087 | 5/1974 | Schmelzer | 324/688 |
| 3,969,927 | 7/1976 | Yoshida et al. | |

(List continued on next page.)

FOREIGN PATENT DOCUMENTS 883836 11/1981 U.S.S.R.

OTHER PUBLICATIONS

Olsson et al., "Assessment of the Piezo-Electric Foil as a Mean of Monitoring the Wall Turbulence", *The Aeronautical Research Institute of Sweden (FFA)*, Stockholm, Document No. FFATN 1985–60, 1985, pp. 1–31.

Rogowski et al. "The Evolution of 'Smart' Composite Material", *NASA Tech. Briefs*, Oct., 1988, pp. 20–22.

Goldberg and Lardiere, Jr., "Developments in Expulsive Separation Ice Protection Blankets", *AIAA, 27th Aerospace Sciences Meeting*, Reno, Nevada, Jan. 9–12, 1989, pp. 1–5.

Inkpen, Brobeck and Noland, "Developments of a Sensor for the Detection of Aircraft Wing Contaminants", *AIAA, 30th Aerospace Sciences Meeting & Exhibit*, Reno, Nevada, Jan. 6–9, 1992, pp. 1–6.

D. Hughes, "Industry Researchers Develop Variety of Ice Sensors", *Aviation Week & Space Technology*, Jan. 11, 1993, pp. 41–44.

*Primary Examiner*—Richard Chilcot
*Assistant Examiner*—Joseph L. Felber
*Attorney, Agent, or Firm*—Pennie & Edmonds

[57] ABSTRACT

The present invention is an improved ice sensor which is particularly effective in measuring and quantifying non-uniform, heterogeneous ice typically found on aircraft leading edges and top wing surfaces.

In one embodiment, the ice sensor comprises a plurality of surface mounted capacitive sensors, each having a different electrode spacing. These sensors measure ice thickness by measuring the changes in capacitance of the flush electrode elements due to the presence of ice or water. Electronic guarding techniques are employed to minimize baseline and parasitic capacitances so as to decrease the noise level and thus increase the signal to noise ratio. Importantly, the use of guard electrodes for selective capacitive sensors also enables distributed capacitive measurements to be made over large or complex areas, independent of temperature or location, due to the capability of manipulating the electric field lines associated with the capacitive sensors.

31 Claims, 15 Drawing Sheets

U.S. PATENT DOCUMENTS

| | | |
|---|---|---|
| 3,986,110 | 10/1976 | Overall et al. . |
| 4,553,137 | 11/1985 | Marxer et al. . |
| 4,568,922 | 2/1986 | Schwippert et al. . |
| 4,570,881 | 2/1986 | Lustenberger . |
| 4,604,612 | 8/1986 | Watkins et al. . |
| 4,690,353 | 9/1987 | Haslim et al. . |
| 4,732,351 | 3/1988 | Bird . |
| 4,766,369 | 8/1988 | Weinstein . |
| 4,775,118 | 10/1988 | Daniels . |
| 4,841,775 | 6/1989 | Ikeda et al. . |
| 4,845,421 | 7/1989 | Howarth et al. ............ 324/688 |
| 4,891,628 | 1/1990 | Zuckerman . |
| 4,980,673 | 12/1990 | Kleven . |
| 5,005,015 | 4/1991 | Dehn et al. . |
| 5,166,679 | 11/1992 | Vranish et al. . |

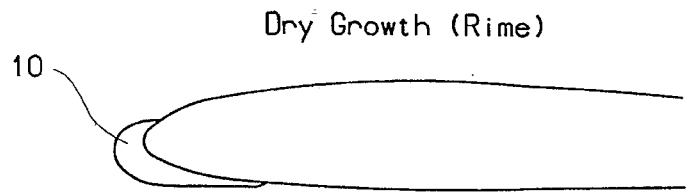
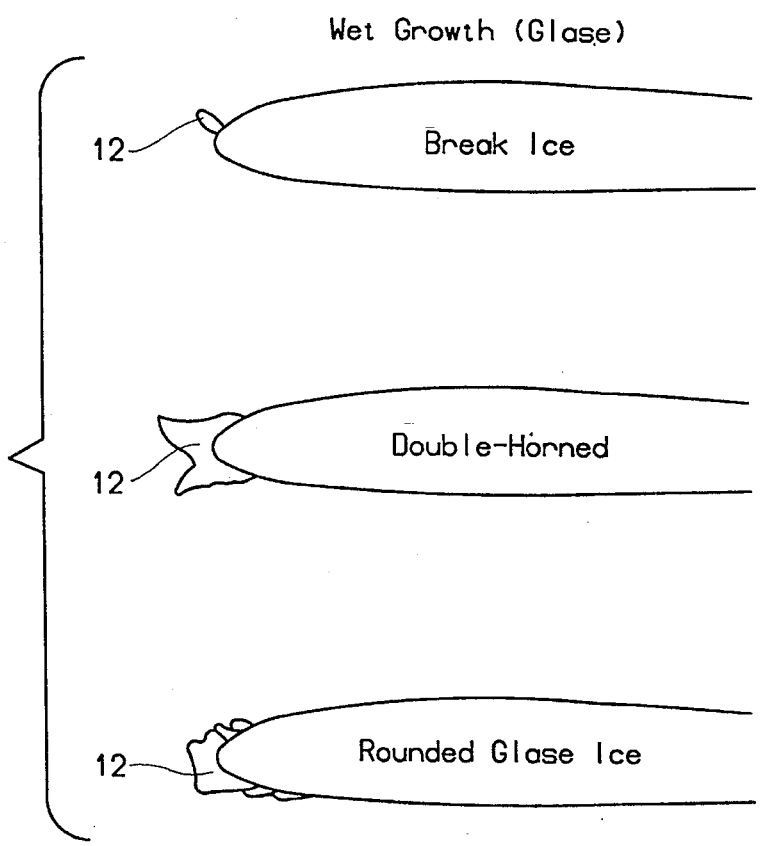

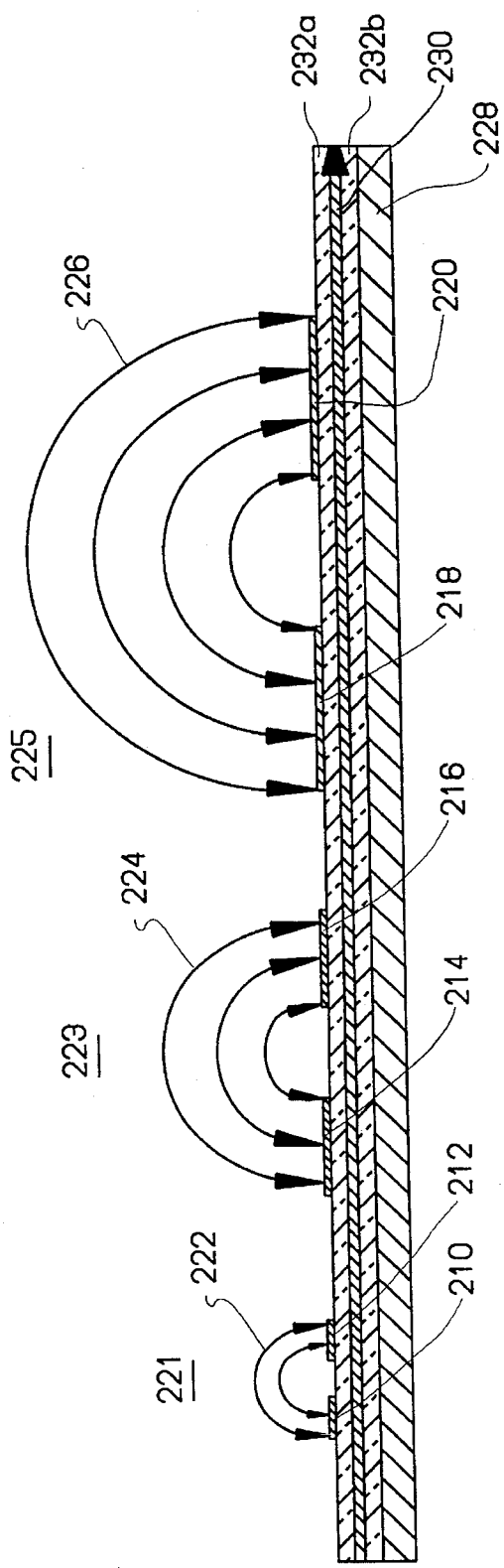
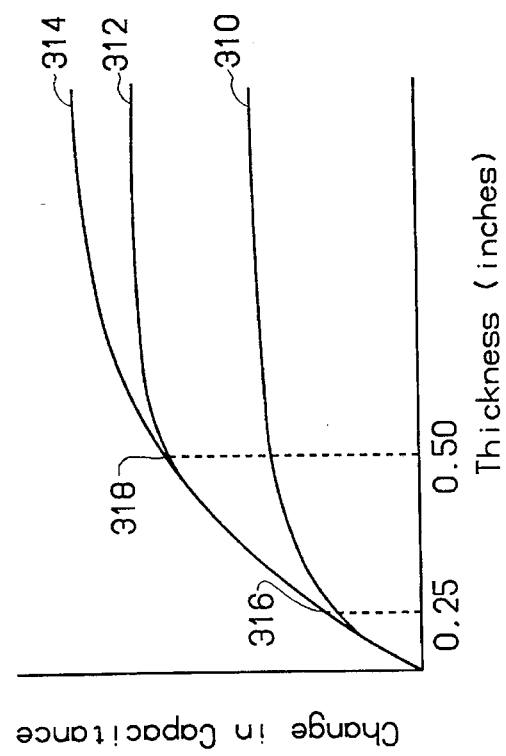
FIG. 2B
FIG. 3

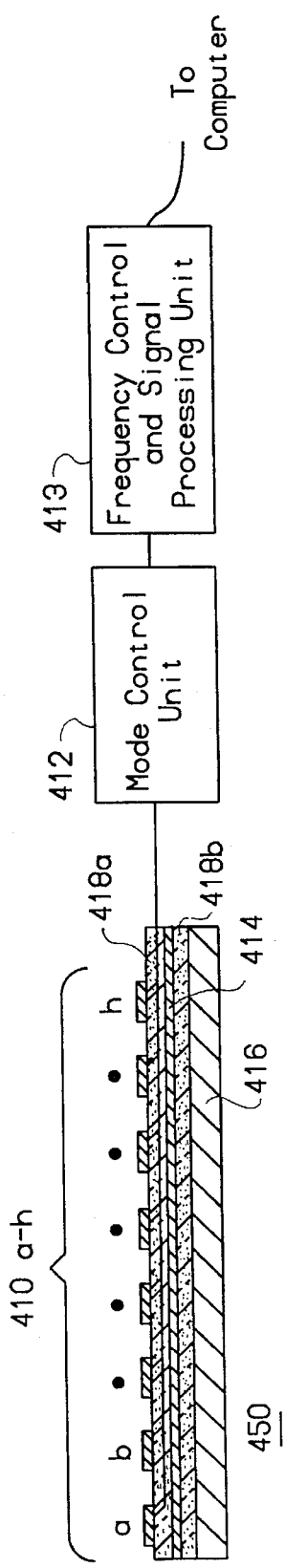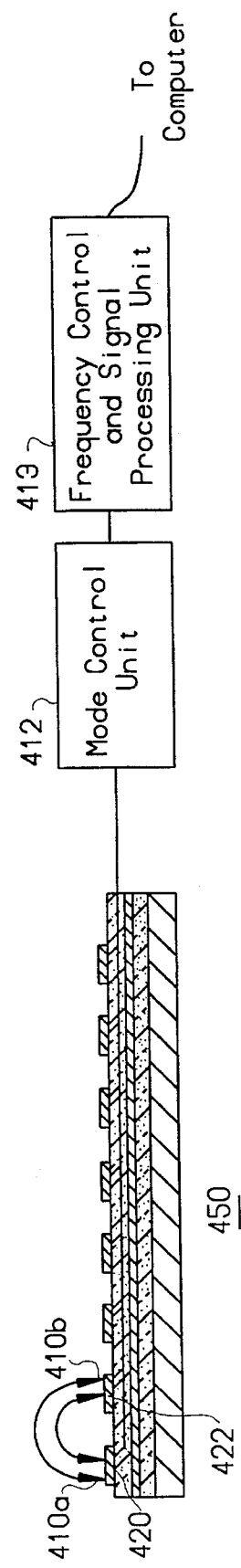
FIG. 4A
FIG. 4B

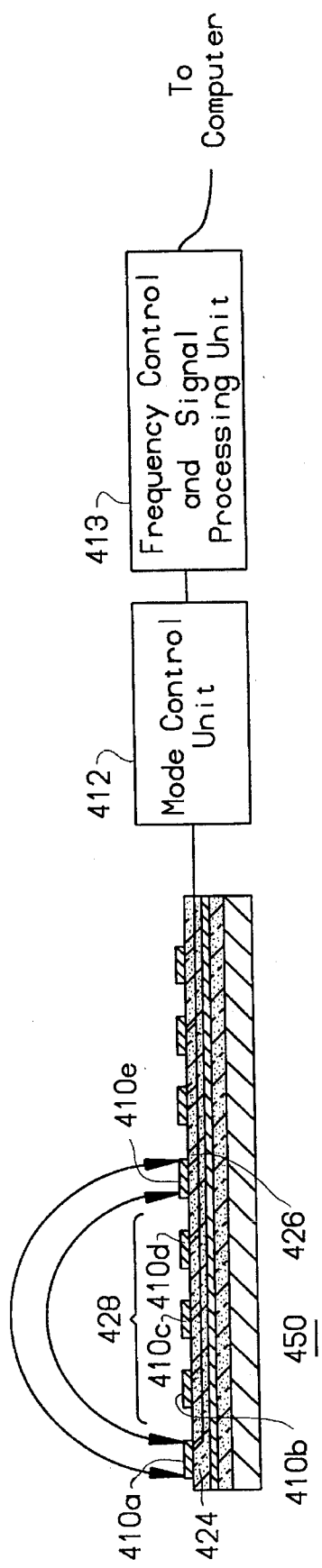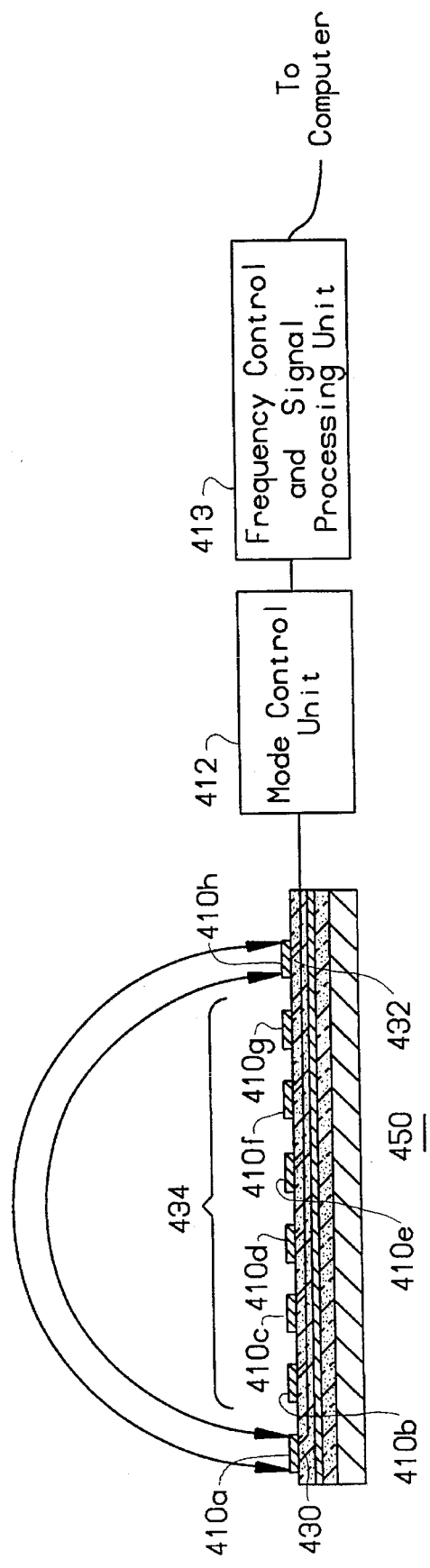
FIG. 4C
FIG. 4D

MEASURING ICE DISTRIBUTION PROFILES ON A SURFACE WITH ATTACHED CAPACITANCE ELECTRODES

STATEMENT REGARDING GOVERNMENT FUNDED RESEARCH

This invention was made with Government support under Contract No. NAS3-25966 awarded by the National Aeronautics and Space Administration. The Government has certain rights in this invention.

CROSS-REFERENCE TO RELATED APPLICATIONS

This is a continuation of U.S. patent application Ser. No. 08/028,436, entitled "Apparatus For Measuring Ice Distribution Profiles," filed Mar. 9, 1993, now U.S. Pat. No. 5,398,547, which is a continuation-in-part of U.S. patent application Ser. No. 07/518,043, entitled "Improved Piezoelectric Sensor" filed on May 4, 1990, now U.S. Pat. No. 5,191,791, which in turn is a continuation-in-part of U.S. patent application Ser. No. 07/295,722, entitled "Smart Skin Ice Detection and De-Icing System", filed on Jan. 10, 1989, now U.S. Pat. No. 5,206,806. Each of these two parent applications is incorporated herein by reference.

TECHNICAL FIELD

The present invention relates to capacitance sensors and, more particularly, to capacitance sensors for measuring the ice distribution profile on a surface. Such sensors are particularly well suited for measuring the ice thickness or ice distribution profile of non-uniform ice on aircraft surfaces. Advantageously, the sensors may be used in an array configuration and may employ signal processing algorithms to monitor the ice distribution profile. Further, the presence of other materials, such as snow, water or deicing fluid, can be determined with the use of signal processing algorithms. Additionally, the sensors may be used in a flexible de-icing boot and trained to automatically expel the ice accretion when a predetermined thickness and/or distribution profile has been detected on the aircraft wing.

BACKGROUND OF THE INVENTION

Aircraft icing is known to occur on aircraft wing and tail surfaces when the aircraft is airborne as well as when the aircraft is stationary on the ground. Airborne icing generally occurs on the leading edges of the wings when the surface temperature is at or below freezing. Unfortunately, this can occur at any time of the year when there is moisture or precipitation and when the aircraft is at or above its freezing altitude. Such airborne ice accretion, or buildup, can have deleterious effects on flight performance. Lift decreases, thrust falls off, drag and weight increase, and stall speed dramatically increases. In recent years, undetected airborne icing has contributed to a number of catastrophic crashes and continues to threaten general aviation and high performance commercial jet aircraft.

In the prior art, several ice detection technologies have been developed to measure localized icing. Such technologies include the use of visual observation, vibrating sensing probes, probes with optical sensors, and ultrasonic pulse echo sensors. Visual observation is crude, not suitable for measuring the thickness of ice, and is severely limited by darkness or other poor visibility conditions. Technologies using probes are generally unnecessarily complex and the protruding probes cause undesirable drag. Installation of the pulse echo sensor, on the other hand, requires drilling through the aircraft surface; and such a sensor can only measure localized ice thickness.

More recently, ice thickness measurement techniques have been developed based on measuring the capacitance changes at a surface mounted sensor or electrode produced by the presence of ice buildup or water. See U.S. Pat. No. 5,191,791. With known signal processing techniques, capacitive ice sensors can be used to determine the ice thickness independent of ice composition or temperature. See, for example, U.S. Pat. No. 4,766,369, which is incorporated herein by reference.

While the recent ice detection technologies have made some advances, even the most current technology can not measure the ice thickness or ice distribution profile of substantially non-uniform ice. Such non-uniform icing has been shown to readily occur on aircraft surfaces and, undetected, can ultimately lead to crashes.

SUMMARY OF THE INVENTION

The present invention is an improved ice sensor which is particularly effective in measuring and quantifying non-uniform, heterogeneous ice typically found on aircraft leading edges and top wing surfaces.

An illustrative device, or sensor array, in accordance with the invention includes a plurality of surface mounted capacitive sensors, each having a different electrode spacing. These sensors measure ice thickness by measuring the changes in capacitance of the flush electrode elements due to the presence of ice or water. Electronic guarding techniques are employed to minimize baseline and parasitic capacitances so as to decrease the noise level and thus increase the signal to noise ratio. Advantageously, an improved signal to noise ratio provides a more stable measurement of the ice accretion even when the sensor is exposed to vibration and varying temperatures.

Importantly, the use of guard electrodes for selective capacitive sensors also enables distributed capacitive measurements to be made over large or complex areas, independent of temperature or location, due to the capability of manipulating the electric field lines associated with the capacitive sensors.

Another illustrative device in accordance with the invention includes an array of capacitive sensors, switching and controlling electronics, and signal processing electronics. The capacitive sensors, in effect, measure the dielectric properties of the materials (ice or water) by measuring the changes in capacitance of the sensor due to the presence of the dielectric material. The switching and controlling electronics selects which of the numerous sensors the capacitance measurement is to be made from. The changes in capacitance are transmitted to the signal processing electronics where the distribution of the material or ice pack, including its density, average thickness, and peak thickness thresholds are determined.

Another embodiment of the invention comprises an array of thin film sensors and associated integrated microelectronics embedded in a compliant boot or blanket that can be applied directly onto the aircraft surface. The individual sensors may be constructed from a variety of materials including conductive electrodes separated from the surface by a dielectric insulation layer. Advantageously, the electrodes of the sensor can be constructed to stretch or flex with the boot surface by employing a group of wires or conductive fibers arranged to maintain the sensor's integrity while undergoing surface deformation through a pneumatic boot cycling process. Conductive fabrics and wires that stretch bi-directionally allow surface mounted flexible sensors either to be embedded within a pneumatic de-icing boot or applied externally.

Advantageously, ice detection systems constructed in accordance with the present invention exhibit distributed ice measurement capabilities for leading edge ice accretion; runback refreeze ice; and top wing ice associated with ground icing phenomena. Employing signal processing electronics allows numerous variables or parameters associated with the surface icing process to be measured and processed. These variables include, for example, surface temperature, ambient temperature, total temperature, altitude, and time. Additionally, employing signal processing electronics allows capacitance measurements from one or more capacitive sensor(s) to be made at various electrical frequencies.

The capacitive sensors in accordance with the invention overcome the disadvantages of individual point sensors by employing a distributive pattern configuration wherein each sensor is uniquely addressable within the configuration or array. The sensors within the array are designed to project electric field lines of variable height and location in response to signals from control electronics. Alternatively, a plurality of uniquely addressable sensor groups may be used. Further, use of guarding or shielding techniques enables the sensor configuration or array to vary the geometry of the three dimensional electric field. With such a controllable electric field, localized capacitance saturation levels, which are indicative of a threshold ice thickness, can be made. Furthermore, these saturation levels can be used to determine variable density ice thickness threshold levels independent of the ice type or density.

By employing multiple capacitive sensors with increasing ranges or depths of electric field patterns, the ice thickness can be determined in real time to within a particular discrete step or threshold level. This is accomplished by using a multiplexer to individually switch electrodes among one of three states: positive, ground, and guard. A saturated output from a sensor with shorter range electrical field lines along with an increasing output from a sensor with longer range electrical field lines indicates that the ice thickness lies somewhere in between the saturation thickness levels for the two sensors. Also, static thickness measurements can be made by employing the signal processing electronics.

In another embodiment, by scanning an array of capacitive sensors at two or more electrical frequencies, the density of the ice/water medium can be determined. Generally, materials with different dielectric constants have a unique capacitive frequency response. Correlating the capacitive frequency measurements of the ice/water medium with stored capacitive frequency responses yields the type and density of the medium. Once the ice type and density is known, local thickness information can be determined for each sensor based on the measured ice density.

In still another embodiment of the invention, two capacitive measurements may be made at independent field heights, one lower and one higher, to determine the dielectric value for the medium located at the lower height. Once the signal processing electronics determines that the output from the lower sensor has saturated, a look up table is employed to provide the type/density of the ice based on known or previously stored values reflecting the saturation values for different ice densities. Once the density of the ice at the lower height is known, the signal processing electronics scans the sensor projecting electrical field lines at a higher height to determine ice thickness based on stored data in the look-up table associated with the ice type identified by the lower or short range sensor. Accordingly, this process may be extended to multiple height sensors so as to determine the thickness of ice layers having a variable density.

Advantageously, thermodynamic measurements associated with the icing process can be used, in combination with the capacitance sensors of the present invention, to calculate information related to the ice accretion rate.

Further, the capacitive sensors of the present invention can be used with a heating element located proximate thereto to observe the capacitance change of the ice/water during heating and cooling to determine the makeup of the ice/water medium.

Accordingly, it is an object of this invention to provide an ice sensor for measuring and quantifying non-uniform, heterogeneous ice.

BRIEF DESCRIPTION OF THE DRAWINGS

The features and advantages of the present invention will become more readily apparent from the following detailed description of the invention in which like elements are labelled similarly and in which:

FIGS. 1A and 1B depicts typical ice configurations formed on a leading edge of an airfoil;

FIG. 2B depicts a multiple fixed element capacitive ice sensor;

FIG. 3 depicts the typical change in capacitance output by the multiple fixed element capacitive ice sensor depicted in FIG. 2B;

FIGS. 4A-D depict illustrative variable geometry capacitive ice sensors;

DETAILED DESCRIPTION OF THE INVENTION

Detecting and measuring ice that forms on the leading edges of aircraft wings while in flight is a very difficult task. Depending on the ambient atmospheric conditions, the airspeed of the plane, and the wing geometry, different types of ice configurations can form as shown in FIGS. 1A and 1B.

More specifically, when there is small amount of visible moisture and under conditions typical of low air temperature, a dry, low density type of ice 10, known as rime ice, can form. Rime ice configuration 10 is typically characterized by a fairly smooth surface contour. At the other extreme of relatively high temperatures (near the freezing point) and when there is a large amount of visible moisture, a wet, dense, glaze ice 12 can form having typically irregular horn shapes protruding forward from above and below the stagnation line. Many variations in density and shape are possible between these two extremes, including heterogeneous ice formations that start as one type of ice and change characteristics as the meteorological conditions vary.

Recent wind tunnel and flight testing has confirmed that measurements taken from thin film capacitive sensors are largely dependent on the changing temperature and the density of the various ice configurations. As noted above, the airspeed and liquid water content as well as mean volume diameter of the moisture all greatly influence the type of ice that will accrete on the wing surface, including glaze, rime, or mixed ice. An ice sensor suitable for measuring in flight leading edge ice must be capable of dealing with these transient variations in ice composition and shape. Moreover, a suitable ice sensor must be substantially insensitive to airspeed, ambient temperature, liquid water content, ice temperature and temperature gradients, ice density, ice heterogeneity, and surface geometry.

Figure 2A:
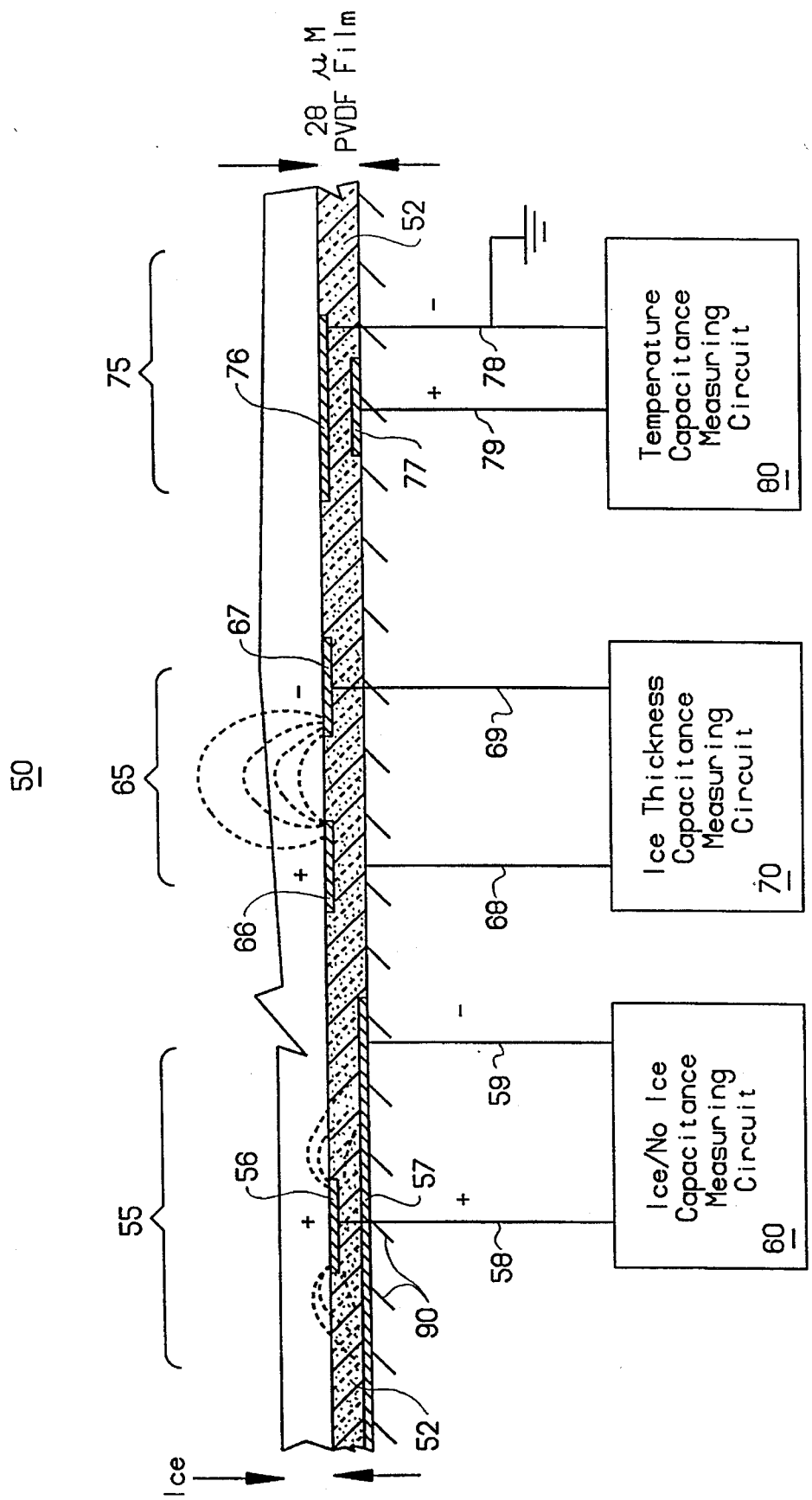
FIG. 2A depicts a thin film capacitive ice sensor comprising a PVDF layer having metallization patterns on each side of the layer.

FIG. 2A depicts a preferred embodiment of a polyvinylidene fluoride (PVDF) sensor for direct localized measurement of ice presence and thickness on a surface. A sensor segment 50 is shown comprising a PVDF layer 52 having metallization patterns on each side of the layer. These metallization patterns form three sensors, namely, an ice presence sensor 55, an ice thickness sensor 65 and a temperature sensor 75. PVDF layer 52 does not have to be polarized for proper operation of sensors 55, 65, 75, although the sensors will operate with a polarized PVDF layer. In one particular embodiment, sensor segment 50 is mounted directly on a surface 90 on an aircraft.

Ice presence sensor 55 operates as a capacitive sensor and comprises first metallization layer 56, second metallization layer 57 and PVDF layer 52 therebetween. Metallization layer 56 functions as a first electrode and is connected to a capacitance measuring circuit 60 by way of a lead 58. Metallization layer 57 functions as a second electrode and is connected to capacitance measuring circuit 60 by way of a lead 59. Layers 56 and 57 are located on opposite sides of PVDF layer 52. Preferably, layer 57 operates as a ground plane and the area of layer 57 is significantly greater that the area of layer 56. As will be appreciated by one skilled in the art, the dashed lines between electrodes 56 and 57 of ice presence sensor 55 are electric field lines. Accordingly, the existence of ice in an area surrounding electrode 56 will interfere with the electric field and cause circuit 60 to detect a change in the capacitance value. The changes in the capacitance value occur due to the difference in the dielectric constants of air and water or ice. The capacitance is determined in part by the medium through which the electric field lines pass. In the embodiment shown in FIG. 2A, capacitance measurements include the effects of the PVDF film as well as the water or ice. Importantly, the baseline capacitance due to the PVDF film can be eliminated through the use of electronic guarding and shielding techniques.

Ice thickness sensor 65 operates as a capacitive sensor and comprises first metallization layer 66, second metallization layer 67 and the materials (air and PVDF layer 52) separating the two layers. Each of these two metallization layers functions as an electrode, is located on the same side of PVDF layer 52 and is facing the environment. Layers 66 and 67 are preferably similar in shape and size and are connected to an ice thickness capacitance measuring circuit 70 by way of leads 68 and 69, respectively. As will be appreciated by one skilled in the art, the electric field as indicated by the dashed lines between layers 66 and 67 will be affected by the accretion of ice between and in proximity with layers 66 and 67. Accordingly, circuit 70 will detect a change in the capacitance value as the thickness of ice changes. Layers 66 and 67 may be mounted on practically any non-conductive surface and need not be mounted on PVDF layer 52. However, use of electronic guarding techniques may be employed to reduce the baseline capacitance if layers 66 and 67 are within close proximity to a ground plane.

Temperature sensor 75 also operates as a capacitive sensor and comprises first metallization layer 76, second metallization layer 77 and PVDF layer 52 therebetween. The PVDF layer between metallization layers 76 and 77 has a dielectric constant and thickness which vary in a known manner with temperature as will be discussed in conjunction with FIG. 2A. Each of layers 76 and 77 functions as an electrode and is located on opposite sides of PVDF layer 52. Metallization layers 76 and 77 are connected to a temperature capacitance measuring circuit 80 by way of leads 78 and 79, respectively. As the temperature changes, the dielectric constant and thickness of the PVDF film between electrodes 76 and 77 change thereby causing the capacitance of sensor 75 to change. Such a change in capacitance is detected by circuit 80. Accordingly, the geometry, spacing and location of electrodes 76 and 77 are such as to maximize the dielectric component of the baseline capacitance and minimize the fringe field components. Alternatively, the PVDF layer separating electrodes 76 and 77 may be suitably doped to increase its dielectric sensitivity with respect to temperature.

Each of circuits 60, 70, and 80 measure capacitance of its associated sensor. Such capacitance depends on the dielectric constant of the material in the gap between the two electrodes of any of the sensors, as well as on fringe effects. Ice and water have dielectric constants up to eighty times greater than air, thus their presence will have a significant effect on detected capacitance values. Accordingly, the presence of water and ice can be detected. Water may be differentiated from ice by employing temperature sensor 75. Capacitance changes occurring above a few degrees centigrade are assumed to be due to water. Temperature sensor 75 may also be employed for temperature compensation.

More specifically, operation of sensors 55 and 65 is dependent on the fringe fields around the edge of the electrodes, since it is only the fringe fields that pass through the ice or water layer to be sensed. Accordingly, the edge length of the electrodes determines the maximum capacitance change possible when the sensor is covered with water or ice. Maximizing the ratio of electrode edge length to total electrode area results in the greater change in capacitance under ice conditions for a sensor of given area.

By employing sensors with different electrodes, the sensitivity to ice may be traded off against the ability to measure greater ice thickness. A sensor with a small spacing between electrodes will exhibit a large change in capacitance when covered by a thin layer of ice. A sensor with greater spacing between electrodes is less sensitive to ice accretion, but has a correspondingly greater ice thickness measurement range. Accordingly, sensor 55 is relatively sensitive and is employed to determine whether or not ice or water is present. This is accomplished by circuit 60 determining whether the measured capacitance is above or below a threshold value. In one particular embodiment, the capacitance of sensor 55 without ice or water present was found to by 400 pF, while the capacitance with ice or water present was found to be 440 pF.

Advantageously, sensor 55 is a point sensor capable of sensing localized ice and employing a capacitor of relatively small physical size. Only ice in close proximity to the sensor has an effect on the capacitance. Several point sensors such as sensor 55 may be connected in parallel so that their capacitance will reflect the average ice thickness on all such sensors, providing a distributed measurement of, for example, ice accretion. Alternatively, a single large sensor strip as opposed to several smaller ones may be employed. The sensor strip may be sufficiently large so as to cover an entire wing surface. Such an embodiment identifies the presence of ice on the sensor strip, but not the location of the ice or how much ice exists on the sensor strip. A preferred configuration is an array of independently wired sensors, such as sensor 55 connected to a multiplexer or scanning device. Advantageously, such an embodiment identifies ice presence and determines ice thickness as well as location, thus yielding true ice distribution measurements. A plurality of sensors 65 may be connected in parallel, as may a plurality of sensors 75.

In another embodiment shown in FIG. 2B, a multiple array of independently wired sensors may be used to measure ice thickness independent of the ice composition, which for leading edge ice can be very difficult to quantify. The operation of the sensor is based on the recognition that the depth of the electrical field line into the ice can be varied by using multiple capacitive sensors with a varying electrode geometry.

FIG. 2B depicts three fixed geometry capacitive sensors 221, 223 and 225, each with a different electrode size and spacing for varying the electrical field line depth projecting therefrom. Capacitive sensor 221 operates as a short range sensor and comprises positive electrode 210, ground electrode 212, and a dielectric insulating layer 232a separating the electrodes. Capacitive sensor 223 operates as a mid-range sensor and comprises positive electrode 214, ground electrode 216 and dielectric insulating layer 232a separating the electrodes. Capacitive sensor 225 operates as a long range sensor and comprises positive electrode 218, ground electrode 220 and dielectric insulating layer 232a. Dielectric insulating layer 232a preferably is kapton. However, other dielectrics such as PVDF and polyester may be used as the dielectric insulating layer depending on the desired application.

As will be appreciated one skilled in the art, the electric fields as indicated by lines 222, 224 and 226 between electrodes 210 and 212, electrodes 214 and 216, and electrodes 218 and 220, respectively, will be affected by the accretion of ice and/or water between and in proximity with the electrodes.

Each of the electrode pairs is located on the same side of dielectric insulating layer 232a and is mounted on the ice prone surface of a wing 228 so as to be facing the environment. A conductive guard plane 230 is interposed between two insulating layers 232a–b and extends beneath the entire width of the three sensors. Guard plane 230 is electrically isolated from the wing and the sensors by insulating layers 232a–b. However, guard plane 230 is preferably maintained at the same electric potential as positive electrodes 210, 214 and 218, although by an individual voltage supply. Importantly, conductive guard plane 230 is used to minimize stray capacitance by eliminating the electric field lines between the positive electrodes and grounded conductive surface of wing 228. For a discussion on the use of a guarding electrode, see, for example, U.S. Pat. No. 5,166,679, which is incorporated herein by reference.

When ice forms upon the surface of wing 228 in the vicinity of the sensors, the measured capacitance between each of the electrode pairs increases due to the difference in the dielectric constants of air, water and ice. Referring to FIG. 3, lines 310, 312 and 314 represent the change in capacitance as a function of ice thickness for sensors 221, 223 and 225, respectively. As noted in FIG. 3, eventually the thickness of the ice will exceed the detection limit of the electric field lines generated by each of the sensors. Typically, the change in capacitance is linearly proportional to ice thickness for small thicknesses, but as the ice thickness increases, the change in capacitance saturates. In one embodiment, short range sensor saturates at a thickness of approximately of 0.25 inches, whereas for mid-range sensor 223 saturation does not occur until an ice thickness of about 0.50 inches. When short range sensor 221 saturates at point 316, its output falls below the output values of mid-range sensor 223 and long range sensor 225, as depicted in FIG. 3.

For the present embodiment, the size and spacing of the short range electrodes are judiciously selected so that when its output diverges from the mid and long range sensor outputs as depicted in FIG. 3 the ice thickness is approximately 0.25". In this manner, only the relative output values from the three sensors are important as opposed to other prior art devices which need to measure and process the absolute magnitudes of all outputs.

Subsequent ice thickness values are quantified in the same manner as described aboveherein. For example, in the present embodiment designed to detect a discrete step accumulation of 0.50" of ice, mid-range sensor 223 is configured with appropriately sized and spaced electrodes 214, 216 so that the resulting electric field lines 224 generate the characteristic curve 312 shown in FIG. 3A. Long range sensor 225 is configured to generate electric field lines 226, with the corresponding change in capacitance versus thickness as shown in curve 314. With the sensors 223 and 225 configured in the above manner, the output from the mid-range sensor 223 falls below the output from long range sensor 225 when sensor 223 is covered with 0.50" or more of ice. Accordingly, the present embodiment is suitable for discerning between 0.25" and 0.50" of ice.

It is contemplated that a greater thickness resolution can be readily achieved by using a larger number of sensors, each with electrodes of appropriate size and spacing.

FIGS. 4A–D depict other embodiments of the invention suitable for use where the ice accumulation is over a range of leading edge locations, depending on the angle of attack of the wing. Referring to FIG. 4A, capacitive sensor 450 employs a variable geometry configuration and comprises a plurality of closely spaced electrodes 410A–H disposed over the ice prone section of the wing's leading edge. Electrodes 410A–H are electrically connected to a mode control unit 412. Control unit 412 independently sets each electrode to operate as either a positive, ground, or guard electrode. Control unit 412, in turn, is connected to a frequency control and signal processing unit 413 which controls the frequency at which the capacitance measurement is made. Further, unit 413 interfaces to a computer and display unit (not shown) for controlling and executing commands transmitted from and to the computer. Such control, computer and display units are well known in the art.

Electrodes 410A–H are mounted above a wide guard plane 414. Guard plane 414 is isolated from the surface of wing 416 and electrodes 410A–H by a pair of thin dielectric insulators 418a–b. As described more fully below, electric field lines of any desired depth can be generated by setting one of the electrodes to a positive potential (positive mode) and another electrode that is a desired spacing away to a ground potential (ground mode). Any intervening electrodes between the positive electrode and ground electrode are set to a guard potential (guard mode). As previously discussed, such guard potential is preferably the same potential as the positive electrode, but is supplied by an independent voltage source.

FIG. 4B depicts variable geometry capacitive sensor 450 of FIG. 4A configured as a short range capacitive sensor. The short range sensor is configured by setting electrode 410A to a positive mode and neighboring electrode 410B to a ground mode. Similarly, the entire array of electrodes 410A–H can be configured into an encompassing band of short range sensors by setting electrodes 410A–H to an alternating pattern of positive and ground electrodes. The latter sensor configuration allows the computer (not shown) to accurately determine the chord-wise extent of the ice formation on the wing.

FIG. 4C depicts variable geometry capacitive sensor 450 of FIG. 4A configured as a mid-range sensor. The mid-range sensor is configured by setting electrode 410A to a positive mode, electrode 410E to a ground mode, and intervening electrodes 410B–D to a guard mode. Electrode 410E is located a desired distance away in accordance with the ice thickness range to be measured. Those skilled in the art will appreciate that the guard electrodes between positive electrode 410A and ground electrode 410E do not significantly influence the desired shape of the resulting electric field lines. Accordingly, the electrical field lines between the guard electrodes and ground electrodes are not shown since the capacitance associated therewith is not involved in the measurements with respect to the positive electrode and the ground electrode.

FIG. 4D depicts variable geometry capacitive sensor 450 of FIG. 4A configured as a long range sensor. The long range sensor is configured by setting electrode 410A to a positive mode, electrode 410H to a ground mode, and intervening electrodes 410B-G to a guard mode.

Those skilled in the art will further appreciate that the saturation level or thickness detection limit for any single sensor is proportional to the spacing between the positive and ground electrodes. By re-configuring the electrodes via mode control unit 412 different quantized thicknesses can be measured. For example, in one embodiment, the short range, mid-range and long range sensors can be used to detect ice thicknesses of 0.1" and 0.4".

Advantageously, the capacitive sensor of the present invention can be utilized in a closed loop system to automatically control de-icing equipment currently used on commercial aircraft. A specific application is to automatically activate the pneumatic de-icing boots commonly found on commuter airplanes. These de-icing devices typically require that the ice accumulation on the leading edge of the wing be between 0.25" and 0.50" thick prior to being activated. Currently, the pilot is responsible for making this decision which can be difficult under the best of conditions and can be virtually impossible under conditions of darkness, high work load during takeoff and landing, poor visual access due to swept wings and hidden tail surfaces, etc.

The inventive capacitive sensors described above may be utilized in conjunction with signal processing electronics and a computer to not only monitor the ice accumulation on the aircraft wings, but also to activate the de-icing boots at the appropriate time without the pilot's intervention.

Figure 5A:
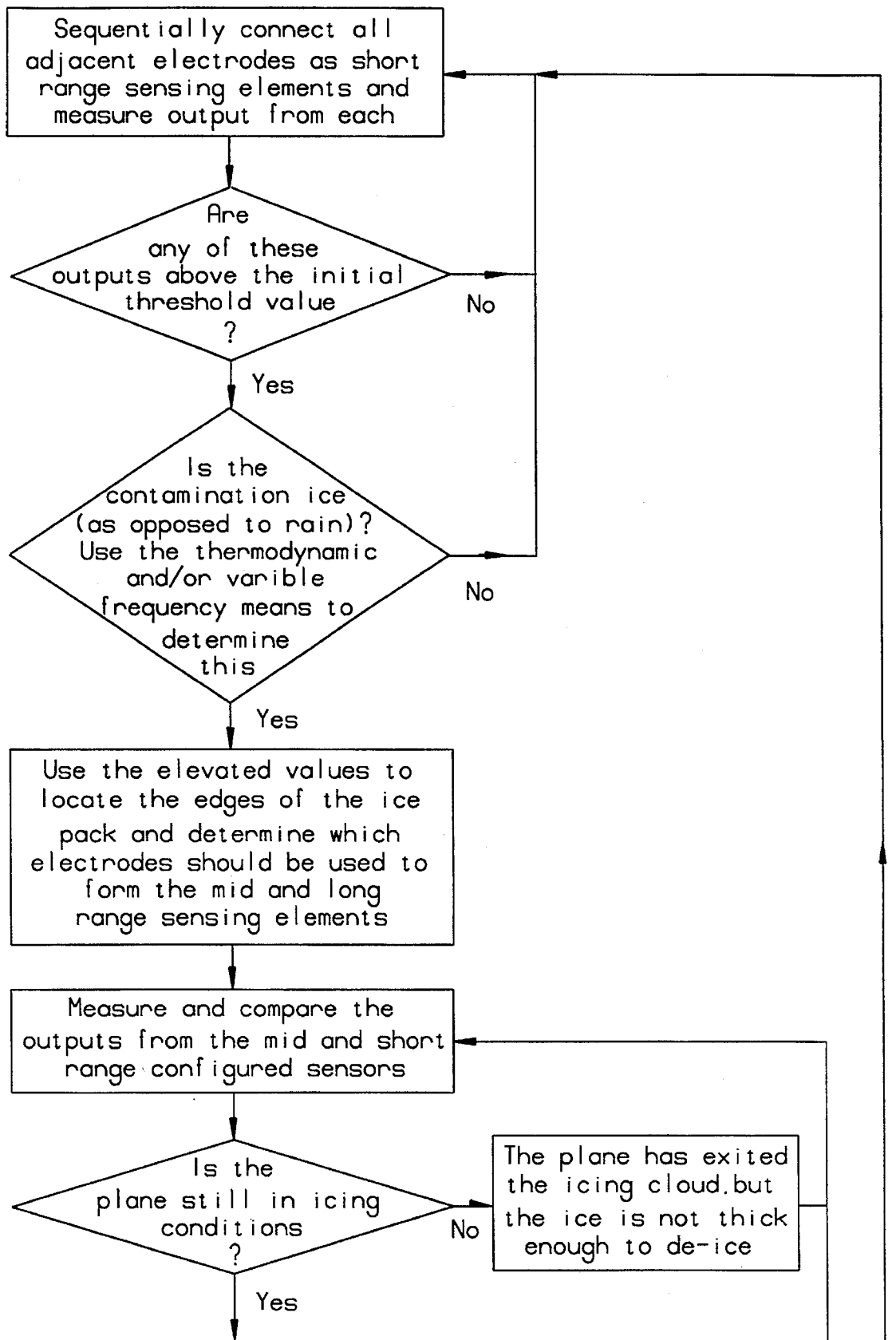
FIGS. 5A-C depicts a closed loop control algorithm useful in processing the output from the variable geometry capacitive ice sensors depicted in FIGS. 4A-D.
Figure 5B:
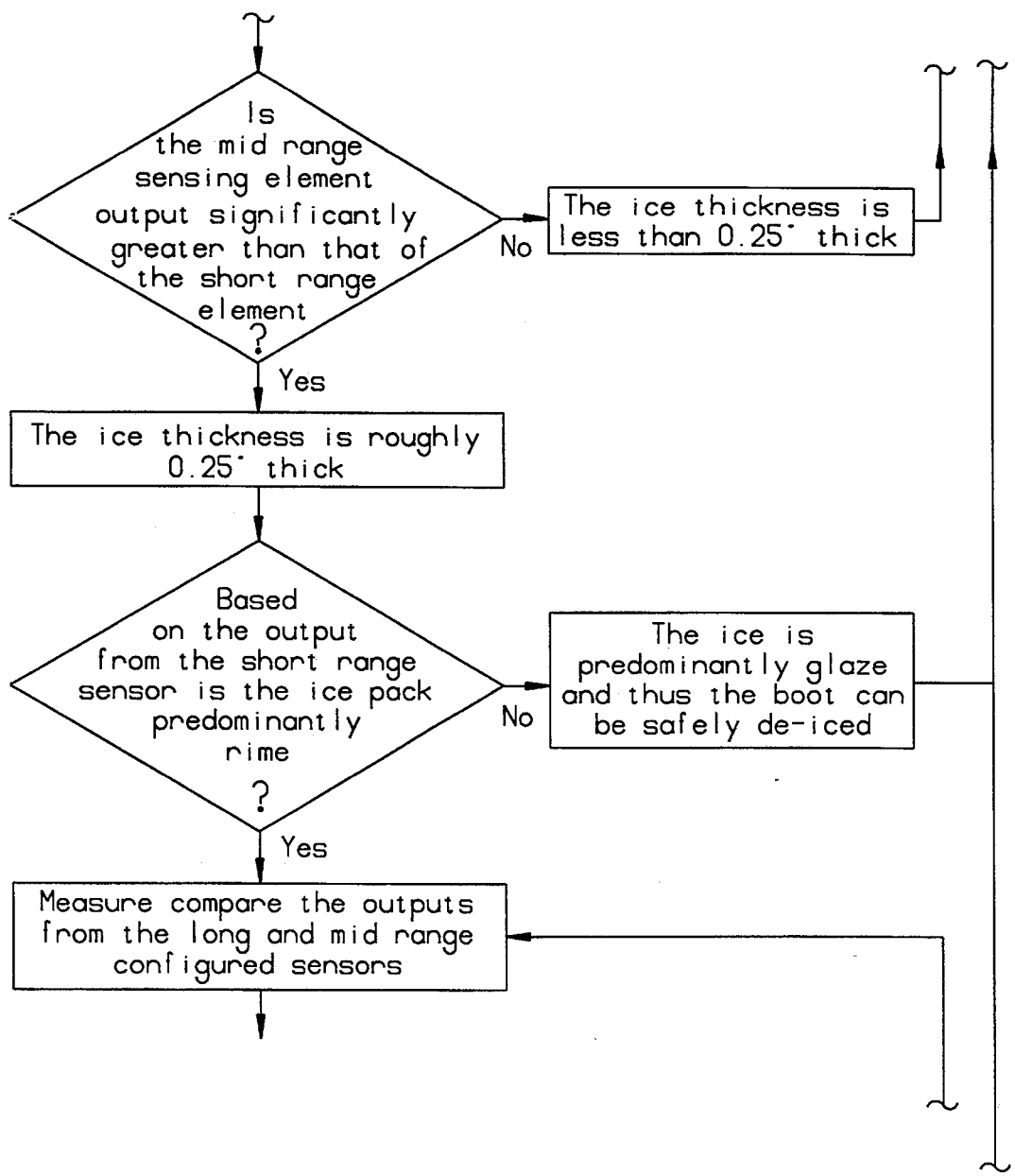
Figure 5C:
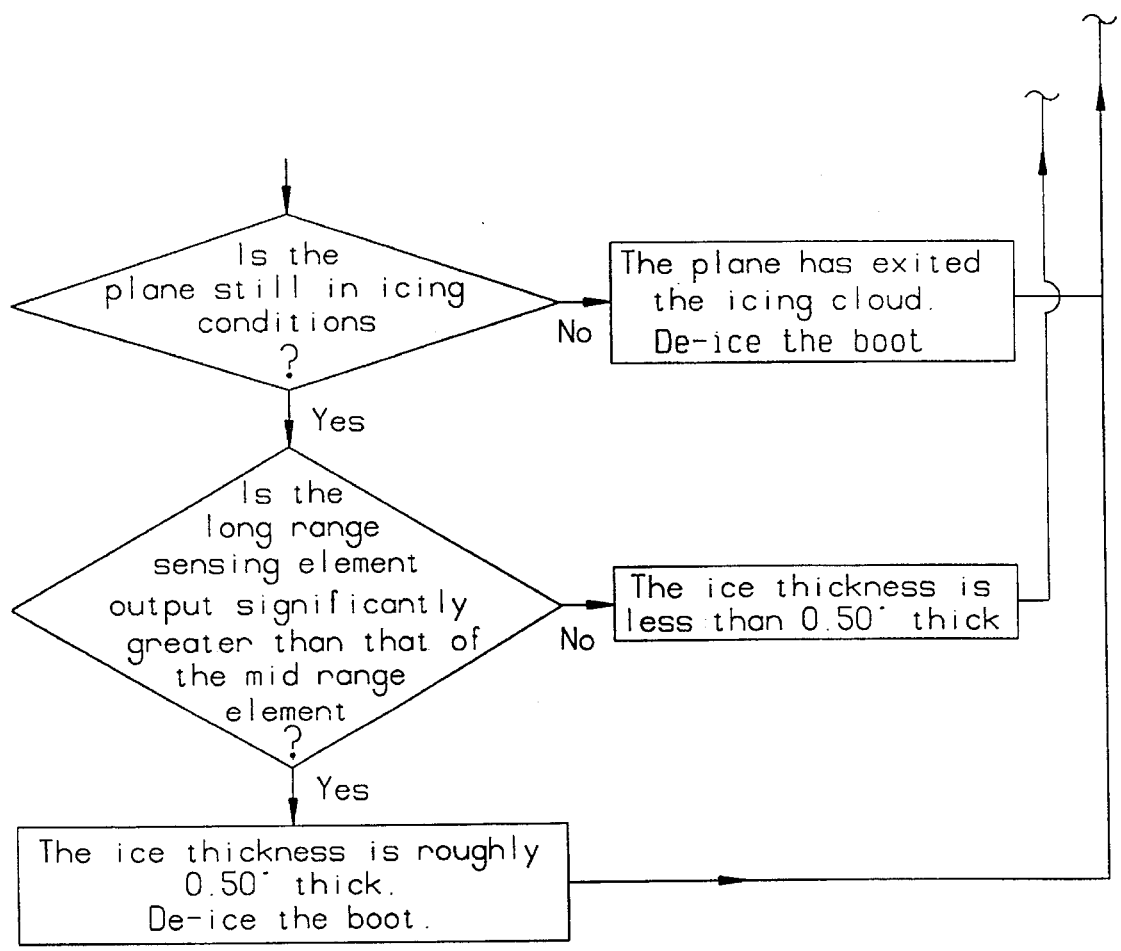

FIGS. 5A–C depicts a closed loop control algorithm useful in processing the output from the capacitive sensors for automatically controlling the de-icing operation. Illustratively, capacitive sensors such as those depicted in FIGS. 4A–D are employed. The capacitive sensors are initially configured as a series of short range sensors. Capacitance measurements are taken for each of the sensors and, if there is any contamination on the wing, one or more of the sensors will register a value above the baseline capacitance.

Other thermodynamic or frequency based control algorithms may be used, as discussed below, to determine if the contamination is ice or rain water. If the contaminant is ice, the upper and lower physical limits of the ice pack are identified based on the initial short range measurements. Then, a determination is made as to which electrodes should be used to form the mid-range and long range sensors for the desired ice thickness range.

Outputs from the short and mid-range sensors are measured and used along with thermodynamic parameters to determine if the plane is still under icing conditions. At this point if icing conditions do not exist and the ice accumulated is too thin to safely de-ice, the de-icing operation is not activated.

If the plane is still under icing conditions, the outputs from the short and mid-range sensors are compared, as discussed above, looking for divergence in the output signals and an indication that the average thickness has exceeded 0.25". When the first threshold thickness is reached and a determination has been made that the ice is of the glaze type, the boots can be safely inflated for effecting de-icing.

An evaluation of the de-icing operation is made and, if it is determined that a substantial quantity of ice is still left on the wing boot, inflation will be repeated until a clean wing signal is achieved.

For ice of the rime variety, a more effective de-icing operation can be achieved by waiting until roughly 0.50" of ice has accumulated. Measurements are now taken with the sensors configured as mid-range and long range sensors. If the plane leaves the icing cloud, it is acceptable to de-ice the boot at this point. However, if icing still exists, once the 0.50" threshold is reached, the boots are activated. Again, an evaluation is made of the de-icing operation and, if it is determined that a more than acceptable quantity of ice is still left on the wing, the boots are re-inflated until a clean wing signal is achieved.

It is contemplated that the above closed loop control algorithm can be readily achieved by well known signal processing electronics, including but not limited to minicomputers and microcomputers. Other signal processing electronics can be incorporated with the present invention to realize an autonomous de-icing system. Additionally, other control algorithms can be envisaged which include 1) monitoring the relative rate of capacitance change for the short range, mid-range and long range sensors to infer discrete thickness values; 2) using the final value of the short range sensor to infer a discrete value for ice composition and then using the outputs from the other sensors to find thickness from the appropriate look-up table for that ice composition; 3) using the thermodynamic parameters; 4) using frequency based capacitive measurements; and 5) use of pattern recognition and, more specifically, neural network techniques.

Figure 6A:
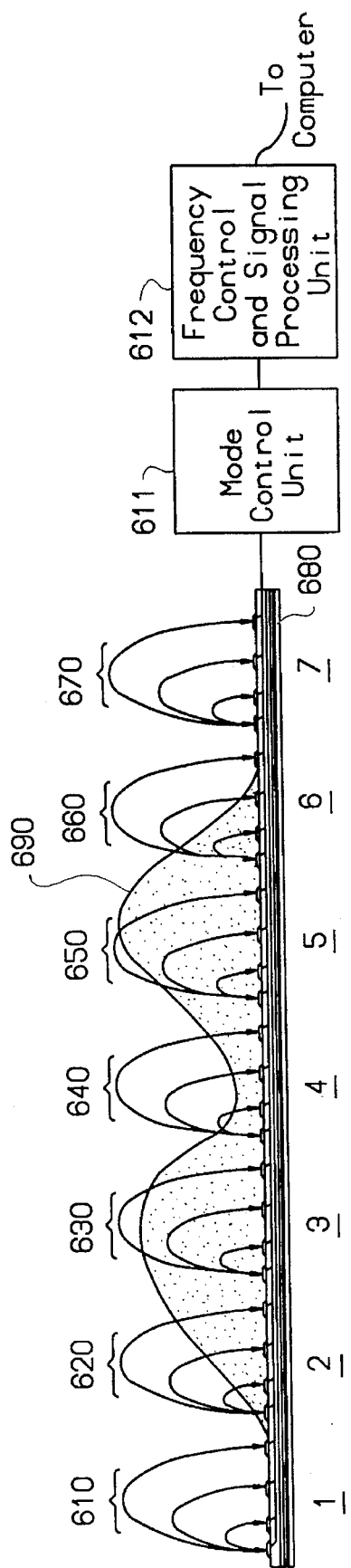
FIG. 6A depicts an illustrative array of multiple element sensors for measuring the ice distribution profile.

FIG. 6A depicts another embodiment of the present invention for measuring ice thickness at a number of discrete locations. Such information yields a thickness profile of the ice accumulation. Sensor 600 comprises an array of tightly spaced multiple element sensors 610 through 670, coupled to a mode control unit 611 and a frequency control and signal processing unit 612. Sensors 610 through 670 are illustratively of the type depicted in FIGS. 4A–D and include dielectric insulation layers, a conductive guard plane interposed therebetween, and positive and ground electrodes disposed on top of the insulation layer facing the environment.

Multiple element sensors 610 through 670 are distributed over the ice prone surface of an aircraft wing 680. The ice thickness over each sensor in the array is determined in accordance with the description above. As the capacitance measurements are obtained for each sensor, they are plotted on a bar graph.

Figure 6B:
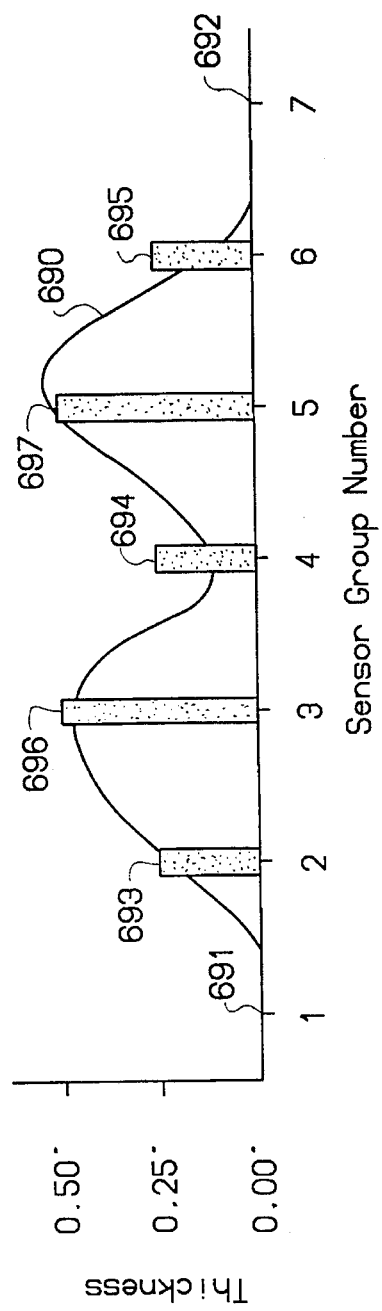
FIG. 6B depicts a typical ice distribution profile measured by the multiple element sensors depicted in FIG. 6A.

FIG. 6B depicts the outputs from sensors 610 through 670, with their respective thickness measurements on the ordinate and their spacing on the wing on the abscissa. Outputs 691 and 692 from sensor 610 (no. 1) and sensor 670 (no. 7), respectively, are associated with an ice thickness of 0". For sensors 620, 640 and 660 (nos. 2, 4, and 6, respectively) their respective outputs 693 through 695 are associated with an ice thickness of 0.25". Further, outputs 696 and 697 from sensors 630 and 650 are 0.50". As can be seen, these values form a discretized step ice profile which represents the distribution of the original ice accretion 690. Discretized curves typical of the one presented may be saved as an array or pattern and then stored in the memory of a computer (not shown) as training data. Such training data may be used to teach a system to recognize future icing patterns by matching the measured profile or pattern against the stored data.

Thermodynamic profiles of the aircraft leading edge may be used for discriminating between ice and rain contamination, for estimating initial icing accumulation rates, and for evaluating the effectiveness of the de-icing operation.

To better understand, however, the use of the thermodynamic profiles, it would be advantageous to discuss the thermodynamics of the aircraft leading edge. The outer surface of an airplane is exposed to a range of temperatures during the course of normal operation. Portions of the skin aligned with the airflow achieve a temperature close to the ambient or static air temperature. Sections of the aircraft facing into the airflow such as the leading edges of the wings and external temperature probes are heated due to the kinetic energy of the oncoming air to a temperature close to what is referred to as the total temperature. The temperature of these forward facing sections can also be influenced by liquid moisture in the air which is at the ambient or static temperature. If the plane flies into a rain cloud the water at the colder static temperature will impinge on the wing lowering the leading edge temperature from the total temperature to a value closer to the static temperature. If the cloud moisture is cold enough to form ice on the wing then the latent heat of fusion released as the water changes to ice will heat the leading edge to a temperature above total temperature. The rate at which the leading edge temperature rises and the peak temperature that it achieves are functions of the ice accumulation rate, flight conditions, and ambient conditions.

Figure 7:
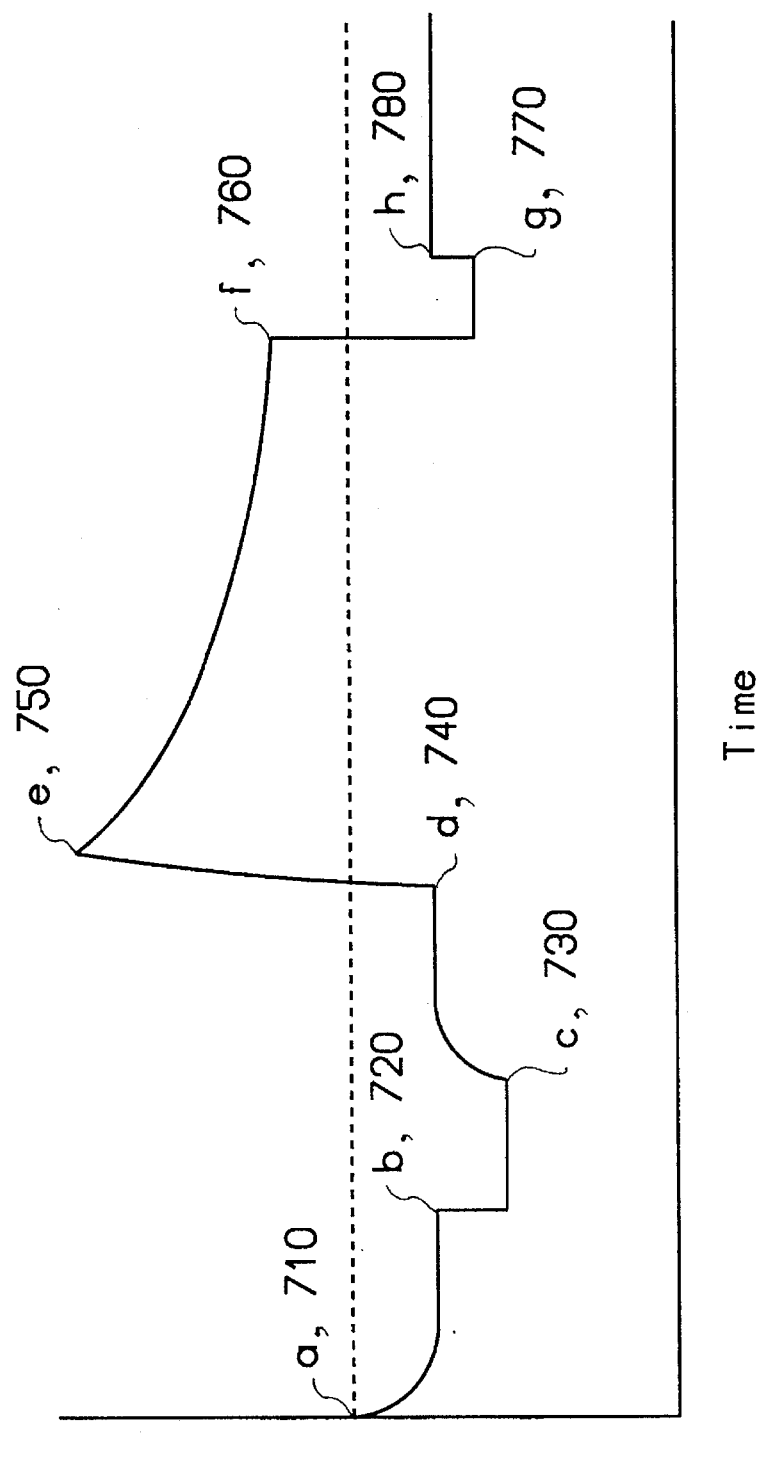
FIG. 7 depicts typical in-flight leading edge thermodynamic profiles.

The thermodynamic behavior of a leading edge under typical flight conditions involving both rain and ice encounters is shown in FIG. 7. The value shown on the ordinate is the maximum leading edge temperature minus the total temperature. With a plurality of temperature sensors distributed along the chord of the leading edge, the measured temperature varies and is dependent on its position with respect to the stagnation line. The temperature sensor nearest to the stagnation line indicates the highest temperature which is closest to the total temperature. When the plane is on the ground both the leading edge temperature and the total temperature are equal to the static temperature because there is no aerodynamic heating.

FIG. 7 depicts a typical in-flight thermodynamic profile of the leading edge of an aircraft wing. On takeoff, shown as point 710, both the total temperature and the leading edge temperature will rise due to the increasing kinetic energy of the air hitting the two surfaces. The leading edge temperature, however, will be the lower due to 1) the likelihood that the stagnation line is not directly over one of the sensors, and 2) conduction losses through the wing to the upper and lower wing surfaces which are close to the static temperature. At point 720 the plane enters a rain cloud and the leading edge is cooled by the water (at static temperature), with the total temperature remaining relatively constant. When the plane leaves the cloud, indicated by point 730, the temperature difference regains its clean wing value. At point 740 the plane enters an icing cloud and due to the large quantities of latent heat released upon phase change from water to ice the leading edge temperature rises to point 750. Again the total temperature remains relatively unaffected by the icing. As the ice pack grows the leading edge sensors are insulated from both the aerodynamic and phase change heating occurring on the ice surface and the leading edge temperature slowly decreases due to conduction through the wing. At point 760 the plane exits the icing cloud eliminating the phase change energy source which dramatically lowers the leading edge temperature as shown. The temperature difference is now below that for the clean wing signal or value because the leading edge sensors are still insulated from aerodynamic heating by the ice pack. When the de-icing boots are successfully deployed and the ice pack removed, shown as point 770, the leading edge temperature returns to the clean wing value at point 780.

In an embodiment which utilizes the thermodynamic profile discussed above, a series of thin temperature sensors located at different chord positions on the leading edge and a single external total temperature probe designed not to accumulate either rain or ice may be employed. Signal processing electronics is used to analyze the resulting data and extract information that is useful in the operation of a closed loop ice protection system.

Figure 8:
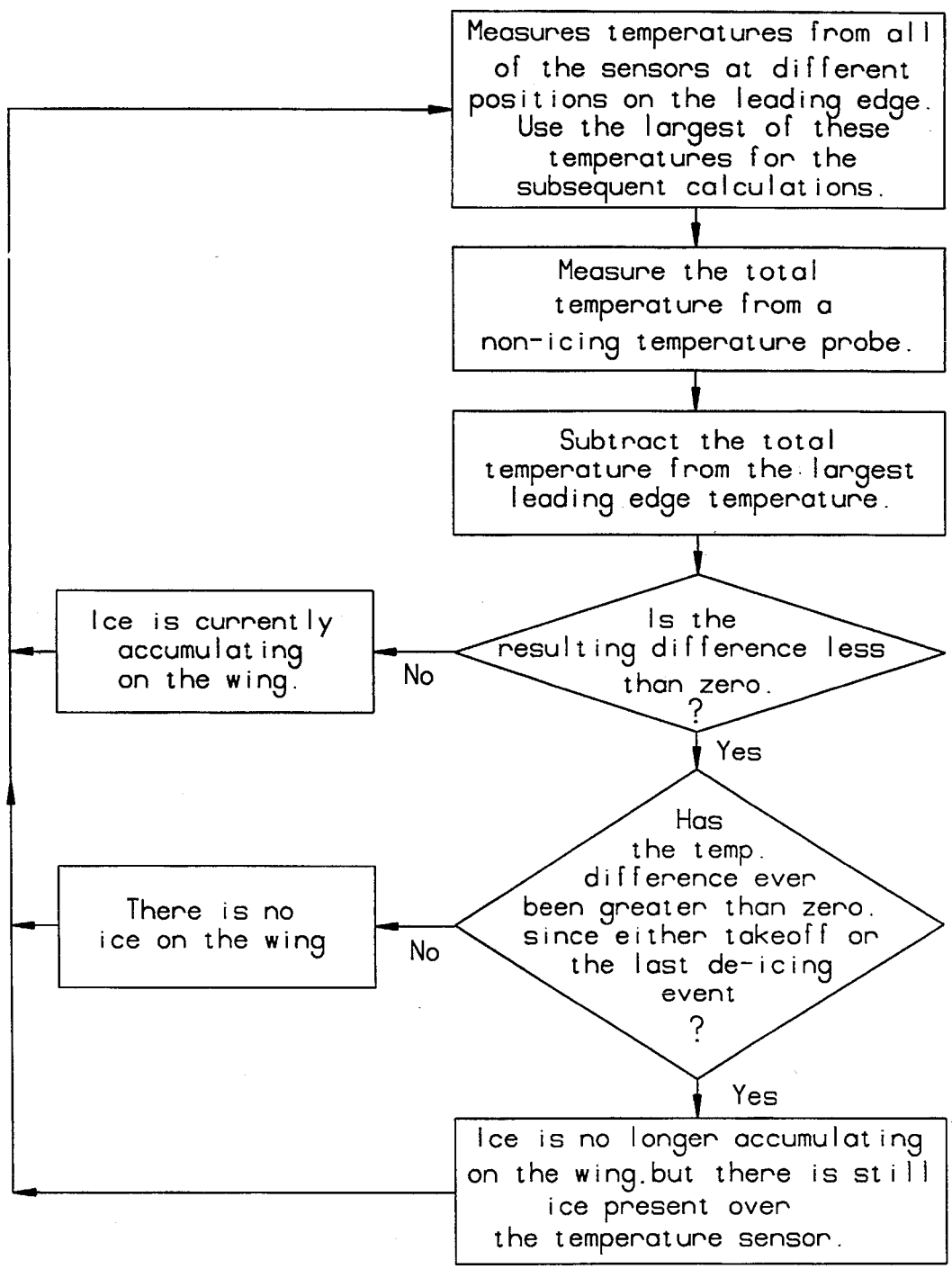
FIG. 8 depicts a signal processing software flow chart useful in analyzing the thermodynamic profiles depicted in FIG. 7.

While there are numerous signal processing techniques for extracting useful information, one exemplary algorithm is presented in FIG. 8. The signal processing electronics records temperatures from the thermal sensors distributed in a chord-wise fashion along the leading edge. The largest of these values is closest to the stagnation line and will be used for subsequent calculations. The difference between this leading edge temperature and the total temperature will be less than zero if the wing is either clean or contaminated with water. Both of these scenarios are non-threatening to the aircraft and require no action from the de-icing system. When the leading edge temperature rises above the total temperature the signal processing electronics generates an output indicating that ice is forming on the wing. Additionally, the rate of change of the temperature difference and the peak difference can be used to calculate the initial ice accumulation rate and used in associated closed loop ice protection algorithms. Transition of the temperature difference from a positive value to a negative value indicates that the plane has left icing, but still has ice on the wing. The closed loop system will activate the boots until the temperature difference returns to the clean wing value.

A second method for discriminating between ice and water is based on the frequency of the capacitance measuring electronics. In the above discussion, the capacitive ice sensors are typically operated at low frequencies where the dielectric constant of ice is relatively high and close to that of water. Under certain circumstances, however, when it is not clear whether the material being detected is ice or water, a second capacitive measurement is used to make the distinction. While the thermodynamic profile can be used for leading edge ice systems, it is not applicable to top wing ground icing. The discrimination between ice and water for both leading edge and top wing ice can be made by changing the operating frequency of the capacitance measuring electronics to a much higher frequency than is ordinarily used. The dielectric constant for water is unchanged over the frequency band of interest, but the dielectric constant of ice is much lower at higher frequencies.

Signal processing electronics may be used to compare capacitance measurements that have been taken at both high and low frequencies. If there is no change in the measured values, then the contamination is water, but if the high frequency value is much less than the low frequency measurement then the contamination is ice. This technique is similarly applicable for discerning between ice and de-icing fluids that are used to remove top wing ice.

To utilize the inventive capacitive ice sensor in aircraft employing a pneumatic boot technology, the sensor must be integrated into a boot without altering the operating characteristics of the boot.

Figure 9:
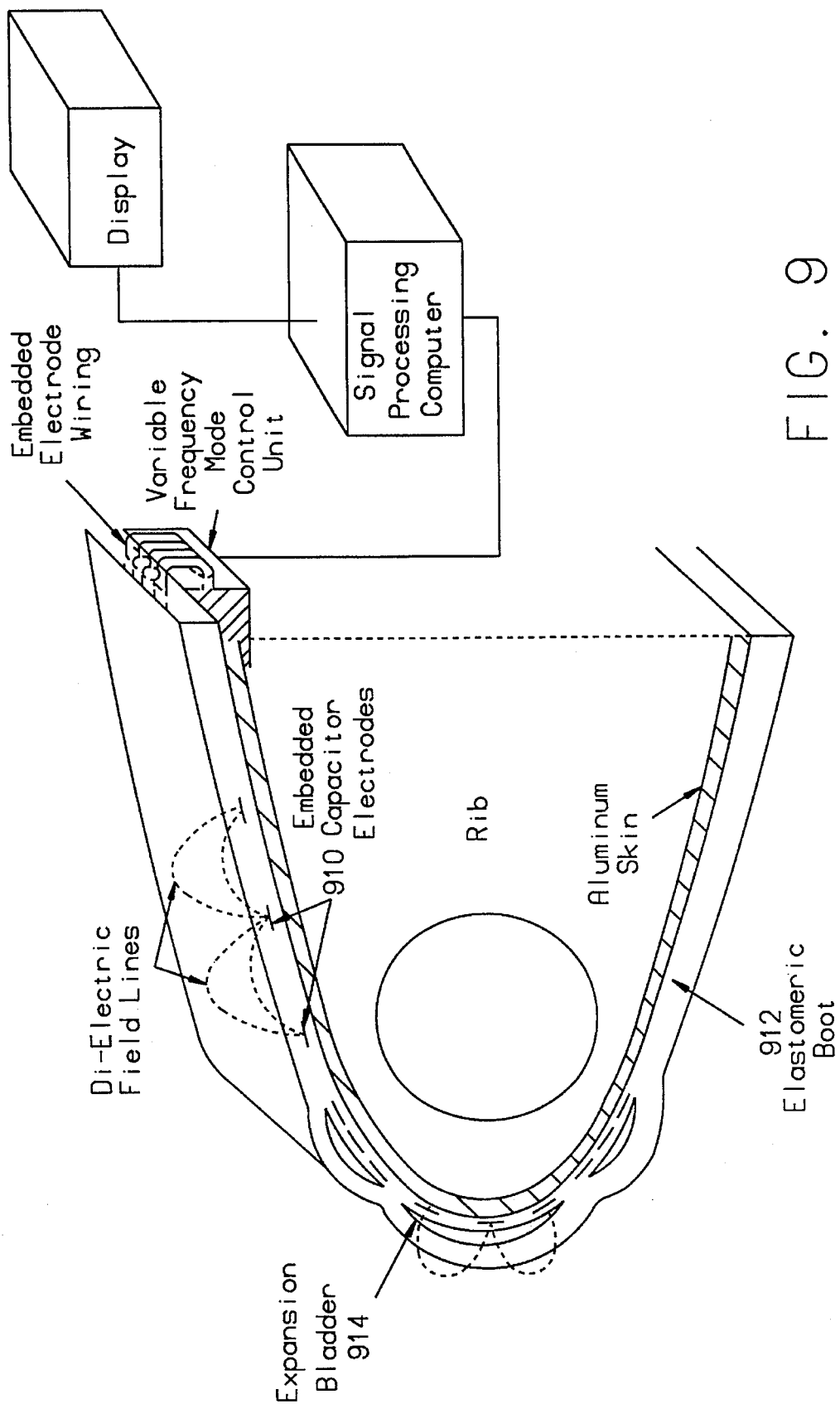
FIG. 9 depicts an illustrative sensor array integrated with a pneumatic de-icing boot mounted on a surface of wing.

There are two possible methods for integrating the capacitive ice sensor with the boot. Referring to FIG. 9, the first employs a sensor 910 integrated into the lower layers of boot 912 below inflation tubes 914. This design requires a sensor which is thin and flexible, but because it does not have to stretch with the inflation tubes it does not have to be elastic. This sensor design would be integrated into the boot during boot manufacture and would be placed above the lower most layers of the boot and below the inflation tubes.

The second method involves placing the sensor above the inflation tubes either embedded into the topmost layers of the boot or externally attached to the surface of the boot. This sensor must be able to generate the desired electric field line geometries as discussed above while remaining elastic enough not to impede the de-icing action of the boot.

Figure 10:
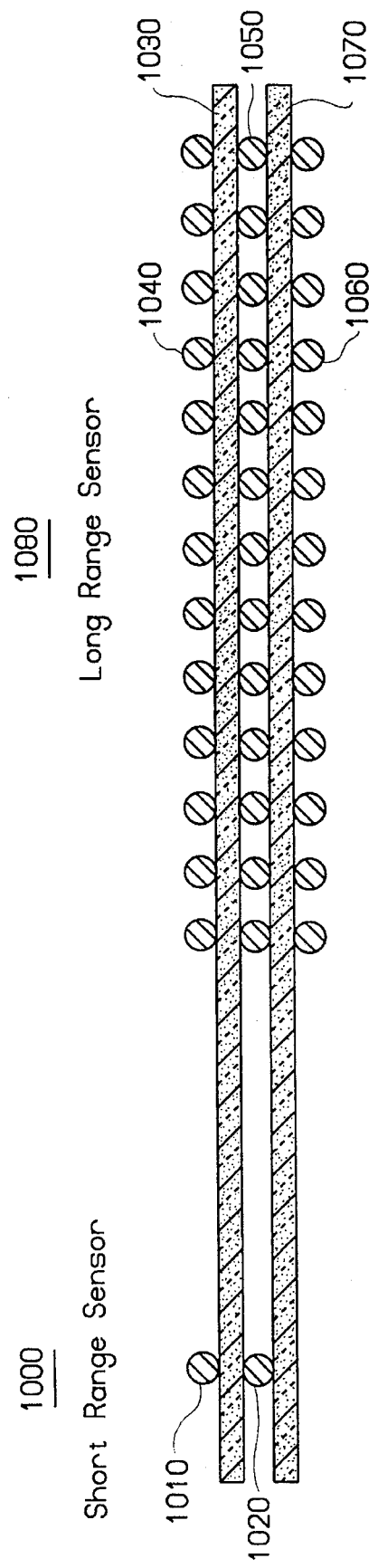
FIG. 10 depicts an illustrative elastic wire capacitive ice sensor.

An elastic capacitive ice sensor capable of operating above the inflation tubes is shown in FIG. 10. This embodiment employs a short range sensor 1000 fabricated from positive electrode wire 1010 located above a ground electrode wire 1020. Positive electrode wire 1010 and ground electrode wire 1020 are separated by an electrical insulator 1030. Preferably, electrical insulator 1030 is made from neoprene. The elastic wire capacitive ice sensor further comprises a long range sensor 1080 fabricated from a series of positive electrode wires 1040 above similarly formed guard electrode wires 1050, which are isolated from positive wires 1040 and ground electrode wires 1060 by electrically insulating sheets 1030 and 1070, respectively. The guard electrodes are used to eliminate the large baseline capacitance between the positive and ground electrodes. The wires and insulating sheets are configured and then potted in an elastic dielectric compound similar to a RTV silicon. A similar embodiment of this elastic sensor can be fabricated using conductive elastic fabric in place of the wires.

The elastic wire sensor described above can be modified to use the variable geometry multiple element configuration depicted in FIGS. 4A–D. For this embodiment, positive wires 1040 are connected to a mode control unit similar to mode control unit 412 of FIG. 4A–D such that they can be set to either a positive, ground or guard mode. Guard wires 1050 are maintained as a guard plane and wires 1010, 1020, and 1060 are eliminated.

Figure 11:
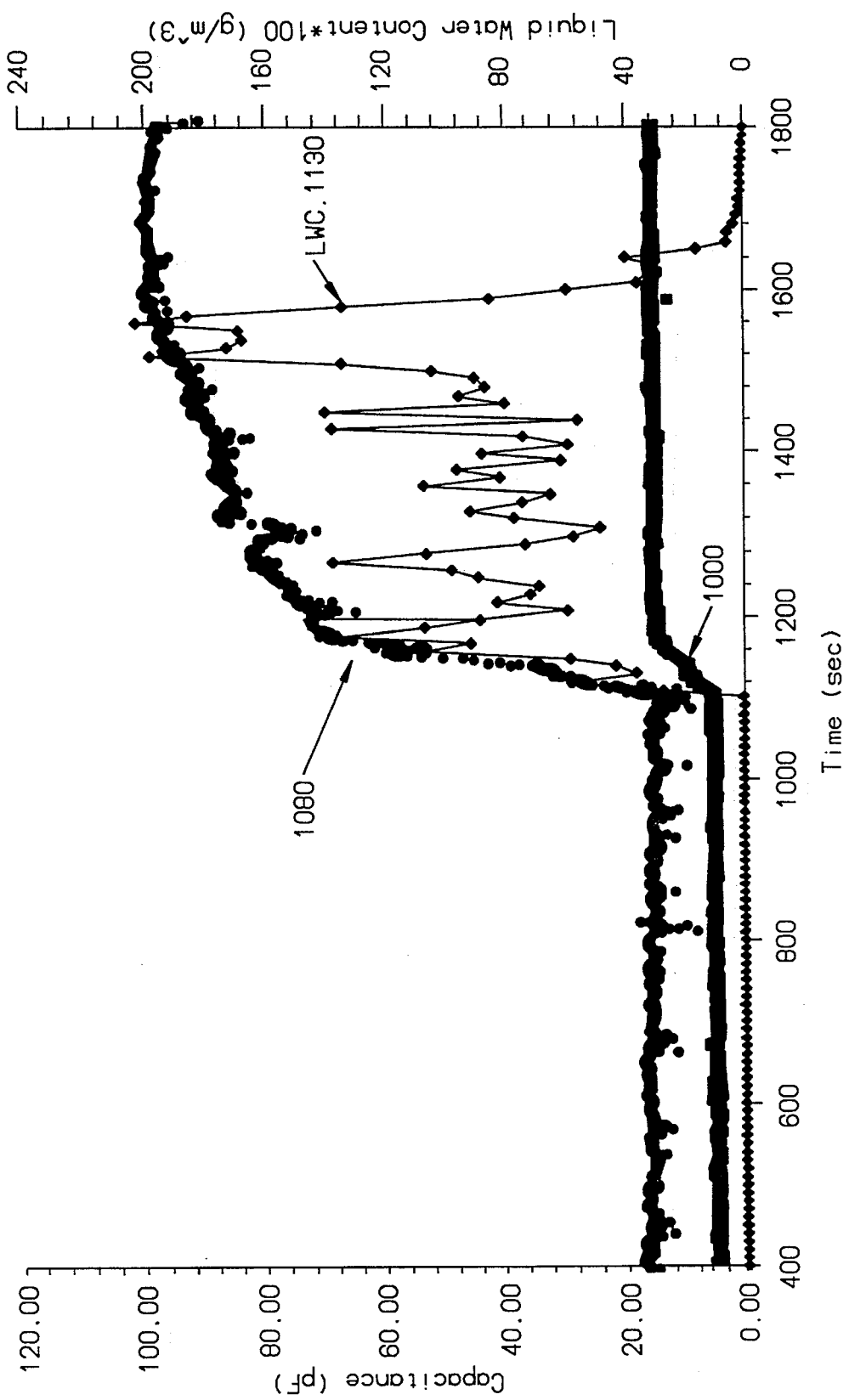
FIG. 11 depicts a time trace of the capacitance reading of a two element elastic wire capacitive ice sensor.

FIG. 11 depicts the data collected for the capacitive ice sensor depicted in FIG. 10 when mounted on a NASA Twin Otter Icing Test Aircraft. Outputs from both short range sensor 1000 and long range sensor 1080 are at their preset baseline values until the onset of icing which is indicated by a jump in the liquid water content, LWC1130, measurement. Both sensors respond quickly to the initial accumulations of ice, but as the ice gets beyond the depth of the short range sensor's field lines the output from that sensor begins to flatten. The output from the long range sensor continues to go up until the plane exits the cloud (evidenced by the return of the LWC measurement to zero), at which point the pilot estimated the average ice accumulation to be 0.75".

Figure 12:
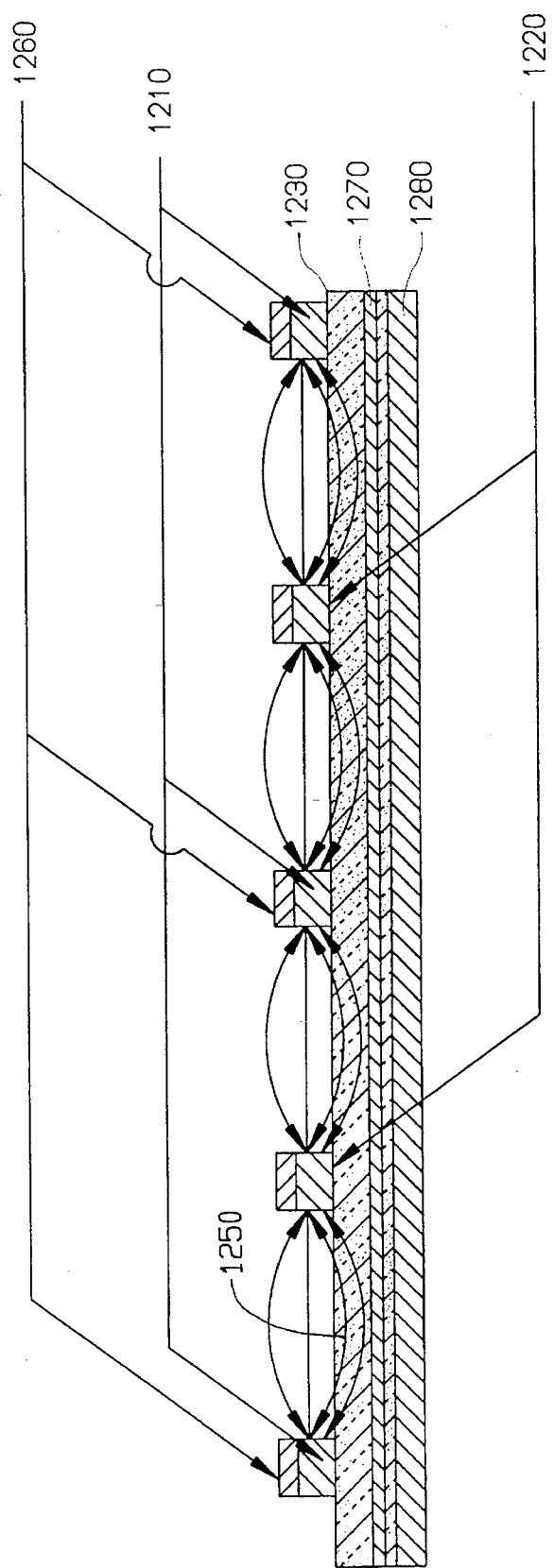
FIG. 12 depicts a capacitive ice sensor mounted on the surface of a top wing.

A slightly modified embodiment of the leading edge capacitive ice sensor can be applied to the problem of detecting the adherence of ice to the top wing surfaces of aircraft while on the ground. In this embodiment, which is shown in FIG. 12, positive electrodes 1210 and ground electrodes 1220 are alternately attached to an electrical insulator 1230 which is located on a ice prone top wing surface 1240. The sensor is designed with very shallow valleys between the positive and ground electrodes, with nearly horizontal field lines 1250 running across them. The horizontal field lines are generated by placing narrow guard electrodes 1260 above each of the positive electrodes. The sensor as shown is sensitive to only the lower most layer of contaminant in contact with the aircraft skin and is not influenced by additional layers of contaminants above the sensor.

It is known that the criterion for safe takeoff is for no ice to be adhered to the skin of the airplane. The sensor depicted in FIG. 12 addresses this concern most directly and avoids interrogating layers of contaminants which are not important to the safety of the aircraft and can only serve to generate confusing information. Stray capacitance between the positive electrodes and the wing are eliminated through the use of a guard plane 1270, which is isolated from the wing by insulating sheet 1280. The sensors which are distributed over the upper surface of the aircraft are designed to be very thin and aerodynamically unobtrusive.

Signal processing electronics (not shown) may be connected to each sensor on the aircraft and used to inform the pilot when there is ice adhering to the aircraft. It is known that ice will form when either water or diluted de-icing fluid drops below its respective freezing point. This sensor, which operates at a relatively high frequency where the dielectric of ice is much lower than that of water or de-icing fluid, will see this freezing process as a rapid drop in the measured capacitance. To verify that the drop was the result of freezing and not the rapid removal of liquid off of the sensor, the operating frequency is lowered to a value where the dielectric of ice is similar to that of water. If the drop in capacitance was due to freezing, the low frequency measurement should be much higher than the high frequency value and should be similar to the value measured before the drop. If the drop was due to liquid contamination drying up from the valleys in the sensor, there should be relatively no difference between the high and low frequency measurements. There are additional signal processing techniques by which the adherence of ice to the aircraft skin can be detected using the described sensor.

Various modifications may be made by those skilled in the art which will embody the principles of the invention and fall within the scope thereof.

We claim:

1. A device for detecting the ice thickness associated with a surface comprising:

a plurality of spaced electrodes, said plurality of spaced electrodes including at least one selectable positive electrode, at least one selectable ground electrode and at least one selectable guard electrode, wherein a capacitance value associated with said positive and ground electrodes is indicative of the ice thickness associated with said surface; and control means for selectively setting from said plurality of spaced electrodes one electrode as said positive electrode, one electrode a desired spacing from said positive electrode as said ground electrode and any intervening electrode or electrodes between said positive and ground electrodes as a guard electrode or electrodes, said desired spacing selected such that the capacitance value associated with said positive and ground electrodes saturates at a predetermined minimum ice thickness level.

2. The device of claim 1 further comprising:

first and second dielectric layers; and guarding means disposed between said first and second dielectric layers for substantially eliminating electrical field lines between said positive electrode and said surface.

3. The device of claim 2 wherein said positive and ground electrodes, first and second dielectric layers and guarding means are embedded in an elastic dielectric compound.

4. The device of claim 1 wherein said positive and ground electrodes are made from an elastic conductive material.

5. The device of claim 1 wherein said positive and ground electrodes are elastic wire electrodes.

6. The device of claim 1 further comprising processing means for determining the ice thickness level on said surface from the capacitance value corresponding to the saturation level.

7. The device of claim 1 further comprising means for measuring at a first frequency the capacitance value associated with said positive and ground electrodes.

8. The device of claim 7 further comprising means for measuring at a second frequency the capacitance value associated with said positive and ground electrodes for determining whether accretion on said surface is primarily ice, water or some other contaminant.

9. The device of claim 1 further comprising means for maintaining said positive and ground electrodes at first and second electrical potentials, respectively.

10. The device of claim 9 further comprising means for maintaining said guard electrodes substantially at said first electrical potential.

11. The device of claim 10 wherein said means for maintaining said guard electrodes substantially at said first electrical potential is electrically isolated from said means for maintaining said positive and ground electrodes at said first and second electrical potentials, respectively.

12. A device for detecting the ice thickness profile associated with a surface comprising, a plurality of capacitance sensors each having:

a plurality of spaced electrodes including at least one selectable first electrode, at least one selectable second electrode and at least one selectable guard electrode, wherein a capacitance value associated with said first and second electrodes is indicative of the ice thickness associated with said surface; and control means for selectively setting from said plurality of spaced electrodes one electrode as said first electrode, one electrode a desired spacing from said first electrode as said second electrode and any intervening electrode or electrodes between said first and second electrodes as a guard electrode or electrodes, said desired spacing selected such that the capacitance value associated with said first and second electrodes saturates at a predetermined minimum ice thickness level, and means for processing the capacitance value from each of said capacitance sensors associated with said first and second electrodes so as to determine the ice distribution profile associated with said surface.

13. The device of claim 12 further comprising control means for communicating to said selectively setting control means which electrodes from said plurality of spaced electrodes are first, second and guard electrodes such that the desired spacing from said first and second electrodes is varied from a first electrode spacing to a second electrode spacing.

14. The device of claim 12 wherein each of said capacitance sensors further comprises:

first and second dielectric layers; and guarding means disposed between said first and second dielectric layers for substantially eliminating electrical field lines between said first electrode and said surface.

15. The device of claim 13 wherein said first and second electrodes, first and second dielectric layers and guarding means are embedded in an elastic dielectric compound.

16. The device of claim 12 wherein said first and second electrodes are constructed from a conductive elastic material.

17. The device of claim 12 wherein said first and second electrodes are elastic wire electrodes.

18. The device of claim 12 wherein said means for processing determines the ice thickness profile from the capacitance value from each capacitance sensor corresponding to its saturation level.

19. The device of claim 12 further comprising means for measuring at a first frequency the capacitance value associated with said first and second electrodes.

20. The device of claim 19 further comprising means for measuring at a second frequency the capacitance value associated with said first and second electrodes for determining whether accretion on said surface is primarily ice, water or some other contaminant.

21. The device of claim 12 further comprising means for maintaining said first and second electrodes at first and second electrical potentials, respectively.

22. The device of claim 21 further comprising means for maintaining said guard electrodes substantially at said first electrical potential.

23. The device of claim 22 wherein said means for maintaining said guard electrodes substantially at said first electrical potential is electrically isolated from said means for maintaining said first and second electrodes at said first and second electrical potentials, respectively.

24. A method of measuring the ice thickness level associated with a surface comprising:

establishing an electric field between positive and ground electrodes, said positive and ground electrodes having a first electrode spacing such that the capacitance associated therewith saturates at a first minimum ice thickness, said positive and ground electrodes at first and second electrical potentials, respectively;

measuring a first capacitance associated with said positive and ground electrodes;

electrically varying the electrode spacing between said positive and ground electrodes by setting another electrode that is a second electrode spacing away from said positive electrode as said ground electrode so as to vary the electrical field distribution between the positive and ground electrodes, wherein the capacitance associated with said positive and ground electrodes now saturates at a second minimum ice thickness;

measuring a second capacitance associated with said positive and ground electrodes, said positive and ground electrodes having said second electrode spacing; and processing the measured first and second capacitances so as to determine the ice thickness level.

25. The method of claim 24 further comprising guarding said positive electrode from said surface by disposing a conductive layer between said positive electrode and said surface, and maintaining said conductive layer at substantially the same electrical potential as said positive electrode.

26. The method of claim 24 further comprising guarding said positive electrode from any intervening electrode or electrodes between said positive and ground electrodes by setting said intervening electrode or electrodes to substantially the same electrical potential as said positive electrode.

27. A method of measuring the ice thickness profile associated with a surface comprising:

a) establishing an electric field between a plurality of positive and ground electrodes, each of said positive and ground electrodes having a capacitance associated therewith that saturates at a first minimum ice thickness;

b) measuring the capacitance associated with said positive and ground electrodes;

c) electrically reconfiguring which electrodes are ground electrodes so as to vary the electrode spacing associated therebetween thereby causing the capacitance associated therewith to saturate at a second minimum ice thickness;

d) repeating steps b and c so as to measure the capacitances between said positive and ground electrodes for various electrode spacings; and e) processing the measured capacitances associated with the positive and ground electrodes and the different electrode spacings so as to determine the ice thickness profile based on when the capacitance saturates.

28. The method of claim 27 wherein step c further comprises guarding said positive electrode from said surface by disposing a conductive layer between said positive electrode and said surface, and maintaining said conductive layer at substantially the same electrical potential as said positive electrode.

29. The method of claim 27 wherein step c further comprises guarding said positive electrode from any intervening electrode or electrodes between said positive and ground electrodes by setting said intervening electrode or electrodes to substantially the same electrical potential as said positive electrode.

30. The method of claim 27 further comprising:

f) acquiring and storing ice distribution profiles for known ice patterns; and g) correlating the measured ice distribution profile with the acquired and stored ice distribution profiles so as to determine the type of ice pattern.

31. The method of claim 27 wherein the step of processing the measured capacitance includes employing neural network or pattern recognition techniques.

* * * * *